United States Patent [19]

Worley

[11] Patent Number: 4,516,606
[45] Date of Patent: May 14, 1985

[54] VARIABLE ORIFICE VALVE ASSEMBLY

[75] Inventor: Arthur C. Worley, Mt. Tabor, N.J.

[73] Assignee: Exxon Research and Engineering Co., Florham Park, N.J.

[21] Appl. No.: 467,089

[22] Filed: Feb. 16, 1983

[51] Int. Cl.³ ............................................. F16K 3/08
[52] U.S. Cl. ......................... 137/625.3; 137/625.31; 138/46; 251/208; 251/175
[58] Field of Search ....................... 137/625.31, 625.3; 138/45, 46; 251/208, 175

[56] References Cited

U.S. PATENT DOCUMENTS

| | | | |
|---|---|---|---|
| 607,669 | 7/1898 | Underwood | 137/625.31 X |
| 1,738,135 | 12/1929 | Bannister | 137/625.31 |
| 1,837,549 | 12/1931 | Herwig, Jr. | 137/625.31 X |
| 2,443,071 | 6/1948 | Honerkamp et al. | 137/625.31 X |
| 2,685,891 | 8/1954 | Segelhorst et al. | 137/614.16 |
| 3,414,007 | 12/1968 | DeMarco | 137/493 |
| 4,275,763 | 6/1981 | Fahrig | 137/375 X |

FOREIGN PATENT DOCUMENTS 1020557  11/1952  France .............. 137/625.31

Primary Examiner—Arnold Rosenthal
Attorney, Agent, or Firm—Donald F. Wohlers

[57] ABSTRACT

A double disc variable orifice valve is provided for fluid solids service in a petroleum process conduit wherein each disc thereof is provided with a plurality of equally spaced and equally sized apertures extending therethrough. One of the discs of the valve is fixed relative to the surrounding valve conduit. Adjacent to the fixed orifice disc or plate, there is provided an adjustable orifice plate having a similar number of sized and spaced orifices. The adjustable orifice plate is supported at its center from the fixed orifice plate in a pivotal mounting arrangement which may include a central fixed aperture.

10 Claims, 7 Drawing Figures

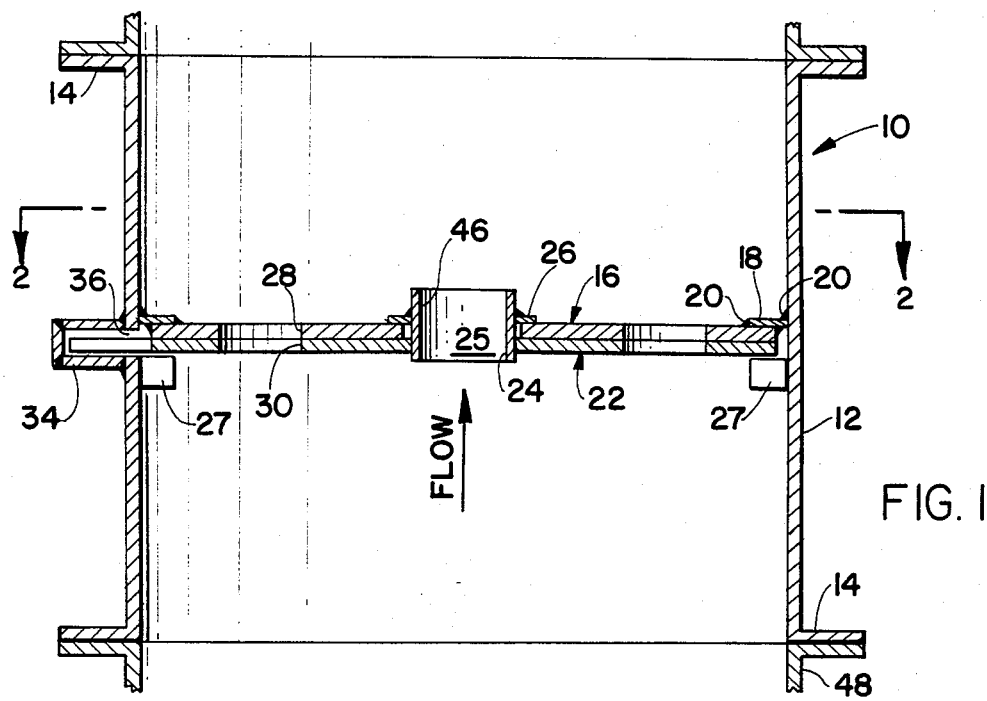
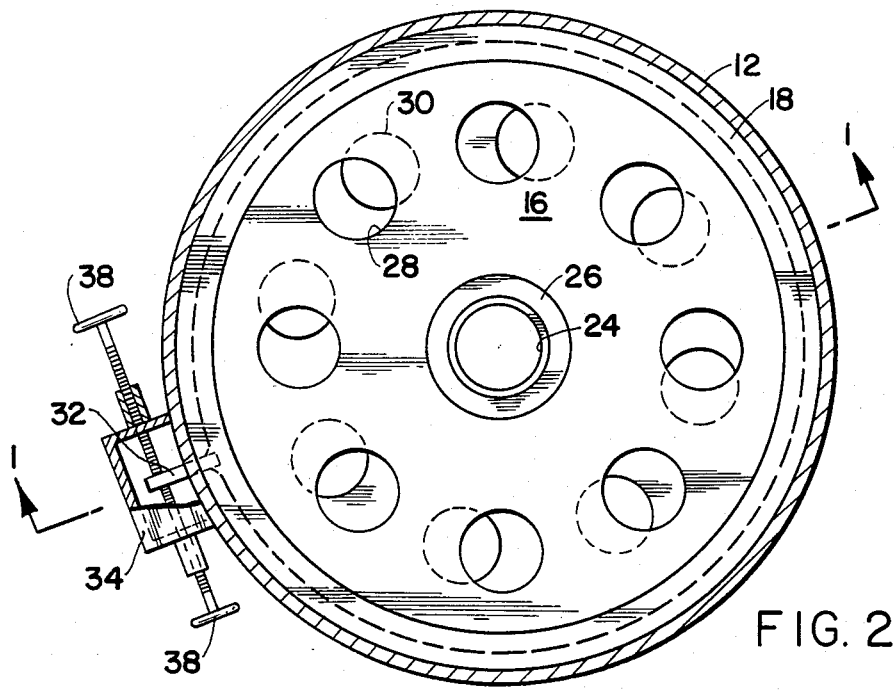
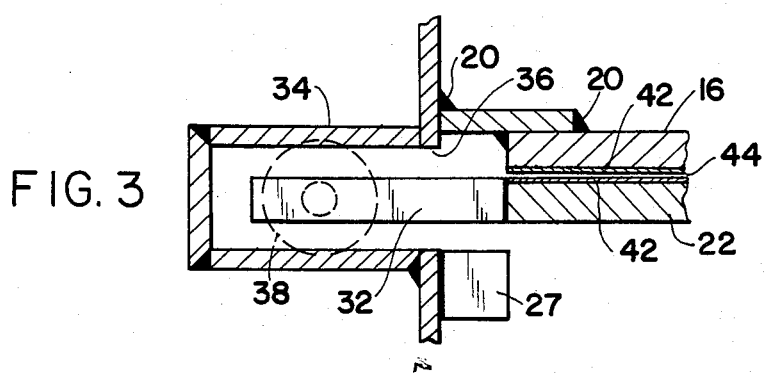

VARIABLE ORIFICE VALVE ASSEMBLY

BACKGROUND OF THE INVENTION

In petroleum processes used in refineries, it is frequently desired to achieve pressure control within a process unit by the use of variable orifice devices in the form of conventional slide valves. Sometimes in place of such slide valves fixed orifice discs are used in conjunction with slide valves to control the pressure of a process unit or the pressure of a flue gas being delivered to downstream equipment. When such fixed orifice discs or slide valves are in compressable fluid service, noise is frequently generated by such orifices and may present a problem. This often leads to vibration problems of components in the system due to resonance caused by the noise or sound energy generated by the variable or fixed orifice devices. By decreasing the pressure differential across an orifice, the noise level generated can frequently be reduced. Sometimes a number of orifices in series are used as a means for sound attenuation in combination with pressure control. The disadvantage of fixed orifices, however, is that pressure control and/or sound attenuation is achieved only at a constant flow rate. However, since petroleum process units' operating conditions are seldom uniform and therefore experience variable internal flow rates and pressure fluctuations, a variable orifice design is highly advantageous to accomplish optimum noise attenuation over a wide range of process conditions. Also, by providing a number of smaller fixed orifice openings in the discs, the frequency of the sound or noise generated can be increased so as to avoid or minimize vibration problems due to resonance effects. Such a variable orifice design as in applicant's present invention will insure good pressure control and/or effective sound attenuation in petroleum process units over a wide range of operating conditions. In particular, the present invention is such that it combines in a double disc variable orifice valve the provision of a fixed orifice as well as desirable frequency modification to control vibration or resonance problems. Accordingly, it is an object of the present invention to provide a simple and novel single valve design wherein a plurality of equally spaced, equally sized orifices are provided on adjacent orifice plates which can be rotated, one relative to the other.

SUMMARY OF THE INVENTION

In keeping with the aforesaid background and object of the invention, a double disc variable orifice valve is provided wherein each disc thereof is provided with a plurality of equally spaced and equally sized apertures extending therethrough. One of the discs of the valve is fixed relative to the surrounding valve conduit and is generally oriented in a horizontal position although any position is possible provided the moveable or adjustable disc is located upstream of the fixed disc. Adjacent to the fixed orifice disc or plate, there is provided an adjustable orifice plate having a similar number of sized and spaced orifices. The adjustable orifice plate is supported at its center from the fixed orifice plate in a pivotal mounting arrangement which may include a central fixed aperture. This central support of the adjustable orifice plate from the fixed orifice plate is such that during normal operation of the process unit, the pressure differential across the plates is such to hold the upstream adjustable plate in tight sealing engagement with the fixed orifice plate. Upon shut down of the process unit, the center support and pivot means for the adjustable orifice plate provides vertical support therefor to prevent its separation from the fixed plate.

A valve in accordance with the present invention is particularly suitable for high temperature gas service wherein it is desired to control the pressure in a flue conduit with minimum noise generation and vibration potential. While valves of this general type using the concept of having orifices in relatively adjustable adjacent disc sections have been known and described in such prior patents as U.S. Pat. Nos. 3,414,007 and 2,685,891, none of these prior references show or suggest the incorporation of a valve in accordance with the present arrangement wherein the pivotal mounting and support for the rotating disc is provided at the center thereof and engages the center of the adjacent disc. In addition, none of the prior art known to the applicant shows an arrangement wherein a variable orifice double disc valve is provided in combination with a center located fixed or non-controllable orifice integral with the pivotal support of the adjustable disc. The center fixed orifice is intended for use as a safety valve to prevent build-up of pressure if the valve is inadvertently closed.

Accordingly, it is an object of the invention to provide an adjustable disc orifice valve which is simple in design, rugged in construction and economical to manufacture.

Another object of the invention is to provide a valve of the present type which is reliable in operation with a minimum of moving parts and critically fitted surfaces otherwise potentially necessitating frequent repair.

These and other objects and uses of applicant's invention will be apparent to those skilled in the art.

For a better understanding of the nature of the invention, reference should be had to the accompanying drawings.

BRIEF DESCRIPTION OF THE DRAWINGS

FIG. 1 is a vertical cross-section of a valve in accordance with the invention taken along line 1—1 of FIG. 2.

FIG. 2 is a horizontal cross-section taken along line 2—2 of FIG. 1.

FIG. 3 is an enlarged fragmentary cross-sectional view of the adjustment means for the orifice plate.

Figure 4:
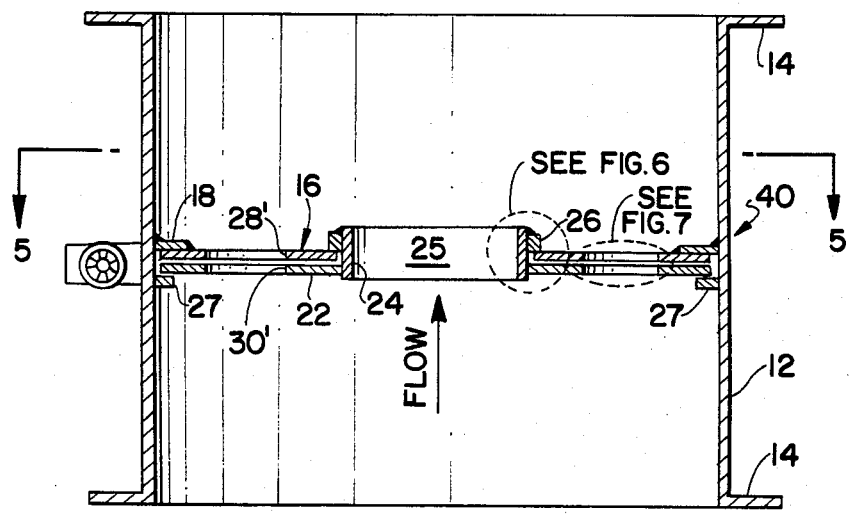
FIG. 4 is a vertical cross-sectional view of an alternate embodiment of the invention taken along line 4—4 of FIG. 5.
Figure 5:
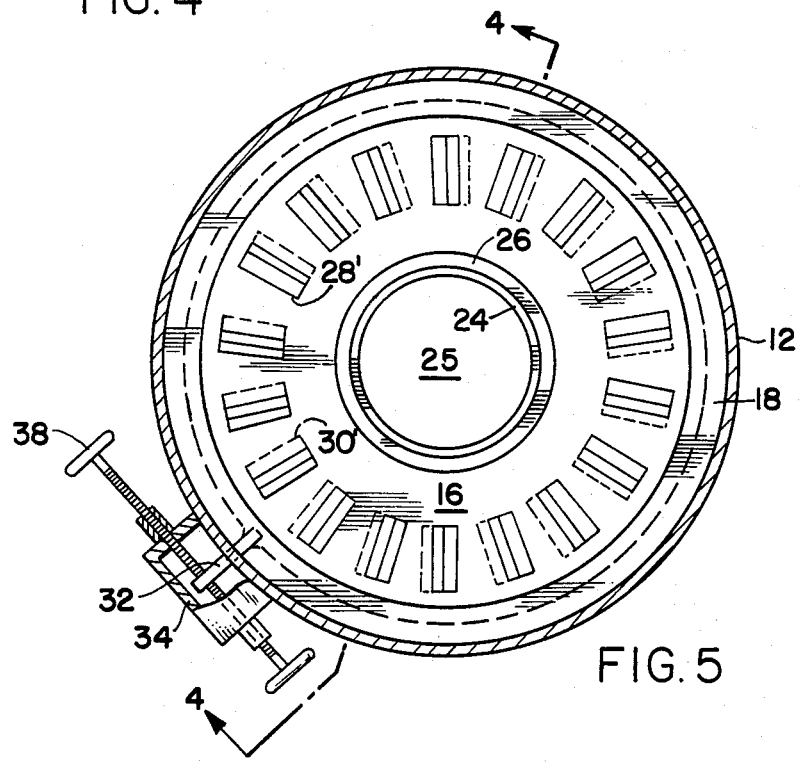
FIG. 5 is a horizontal cross-sectional view taken along line 5—5 of FIG. 4.

It will be understood that the foregoing Figures illustrate merely preferred embodiments of the invention, and that other embodiments are contemplated within the scope of the claims hereinafter set forth.

DETAILED DESCRIPTION OF THE INVENTION

Referring to the drawings, in particular FIGS. 1-3, a variable orifice valve assembly shown generally at 10 includes a main pipe or conduit section 12. The main pipe section 12 includes a pair of opposed end flanges 14 for connection to corresponding flanges of an associated generally vertical petroleum process conduit 48. In the preferred arrangement and use of the valve of the invention, it would generally be located in a vertical conduit of a process unit wherein the flow is vertically upward within the conduit as shown in FIG. 1. Such preferred orientation of the invention, however, should not be contrued as restrictive, and it will be understood that other possible orientations are contemplated as long as the adjustable plate or disc is located upstream of the fixed plate with respect to flow. The valve assembly 10 includes a first and fixed upper orifice plate 16 extending across the diameter thereof fixedly attached to a peripheral flange 18 and the pipe section 12 as by welds 20. An adjustable lower or upstream orifice plate indicated at 22 is supported from the fixed or downstream orifice plate 16 through a central support sleeve 24. The center support sleeve 24 includes an outwardly projecting support ring 26 suitably welded thereto which is in overlapping sliding engagement with the upper surface of the downstream orifice plate 16. The central support sleeve 24 also includes a central aperture 25 for the continual or fixed flow of process fluid vertically upward through the orifice plate valve independent of the relative angular adjustment of plate 22 to plate 16. Where a central fixed orifice is not required, the aperture 25 can be closed off by a plate (not shown) welded to cover the aperture 25.

Referring to FIG. 2, it can be seen that the upper or downstream orifice plate 16 includes a plurality of circular apertures 28 which are circumferentially spaced in an annular ring. In like fashion, the upstream or lower orifice plate 22 includes a similar number of equally spaced orifices 30. The orifice plate 22 is pivotally adjustable or rotatable about the center support sleeve 24 and includes a radially projecting lug 32 affixed to the periphery thereof. The adjustment lug 32 extends radially outward through an aperture 36 in the sidewall of the conduit 12 into an exterior housing 34. The housing 34 includes a pair of opposed adjustment hand wheel means 38 which are threadably engaged thereto in a manner so that the ends of the elements 38 contact the protruding end-portion of the lug 32 to suitably position the orifice plate 22 to the desired valve setting. Those skilled in the art will readily appreciate that other means such as hydraulic rams, electric motors or air motor driven devices can be used to adjust the valve apertures.

Referring particularly to FIG. 3 showing in enlarged fashion the relative positions of the fixed plate 16 to the adjustable plate 22, the spacing gap 44 between the adjacent surfaces of the orifice plates may be seen. In the relationship shown in FIG. 3, the gap 44 is representative of the non-operating condition of the valve where the full weight of the adjustable plate 22 is supported from the plate 16 via the central support sleeve 24 and support ring 26. In operation, with the process fluid flow in the direction indicated in FIG. 1, the pressure differential across the valve is sufficient to move the plate 22 upwardly and into surface contact against the plate 16 as shown in FIG. 1.

Figure 6:
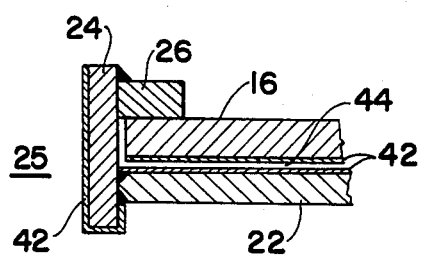
FIGS. 6 and 7 are enlarged detailed views of portions of the valve of FIG. 4.
Figure 7:
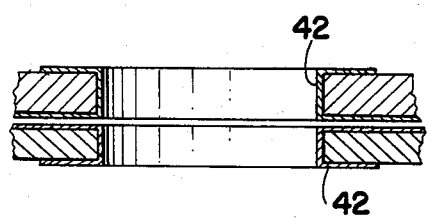

Referring to FIGS. 4–7, an alternative embodiment of the invention is shown. In this embodiment, which is substantially similar to the FIG. 1 embodiment, alternatively shaped rectangular apertures are provided in the upper and lower orifice plates 16 and 22. These rectangular apertures, respectively 28' and 30', are, as in the FIG. 1 embodiment, equally spaced and equally sized so that each is opened a similar amount relative to the adjacent orifice upon movement of the adjustable orifice plate 22. This alternate embodiment of the invention employs reference numerals similar to the FIG. 1 embodiment wherein the elements have similar configurations and functions. It should also be noted that in FIGS. 6 and 7 showing enlarged detailed portions of the cooperative orifice plates 16 and 22 that the high wear surfaces have been provided with hard surface coatings indicated at 42. These coatings may be Stellite 1 or Stellite 6 or other similar coatings and function to lengthen the service life of the valve in a highly erosive process environment. While the presence of hard surfaced coatings has not been specifically illustrated in FIGS. 1 and 2 for convenience, such coatings are contemplated and incorporated into the valve of FIG. 1 in areas corresponding to those shown in the FIG. 4 valve embodiment. Again, it should be noted that in FIG. 6 a similar gap 44 as in FIG. 3 is shown, which gap would be representative of the valve in the non-operating mode wherein the adjustable orifice plate is free to hang by gravity and be supported from the downstream or upper orifice plate 16. In a valve oriented with downward vertical flow, plate 22 would rest on fixed plate 16 so that clearance on gap 44 would not be present as shown in the figures. In both embodiments of the invention, auxiliary support clips 27 are secured to the inner wall of the conduit 12 just below the adjustable orifice plate 22. These auxiliary support clips 27 operate to provide additional support and/or security to prevent the adjustable orifice plate 22 from dropping vertically downward should failure on the support ring 26 occur. For vertical downward flow operation of the valve, clips 27 would not be required since the fixed orifice plate 16 would provide the necessary support.

From the foregoing description of various embodiments of the invention, those skilled in the art will readily appreciate that a novel and simple overall configuration for a variable/fixed orifice valve design is present. Such design is one in which the adjustable orifice plate is centrally supported from the fixed orifice plate and includes a fixed central aperture through both orifice plates. While each of applicant's embodiments have been shown with such fixed non-adjustable central orifice, those skilled in the art will readily appreciate that applicant's invention may readily be incorporated into a valve design wherein no such central fixed aperture is present without departing from applicant's novel concepts.

Therefore, it will be understood that the drawings illustrate merely several preferred embodiments of the invention and that other embodiments are contemplated within the scope of the claims hereinafter set forth.

What is claimed is:

1. A disc valve for controlling the flow of a fluid solids mixture such as present in petroleum process equipment comprising a cylindrical tubular conduit, outwardly extending flange means at opposite ends of said tubular conduit for mounting said tubular conduit in a process conduit, a flat planar first orifice plate extending transversely across said tubular conduit and welded thereto, said first orifice plate including a circular central aperture and a plurality of spaced orifices disposed circumferentially about said central aperture, a flat planar second orifice plate having a plurality of orifices conforming in size and spacing to said orifices in said first orifice plate, said second orifice plate including a cylindrical tubular support means fixedly attached thereto and extending through said central aperture for suspending and pivotally mounting said second orifice plate from said first orifice plate, and means engaging a peripheral edge of said second orifice plate for rotationally adjusting the relative positions of the orifices in said first and second orifice plates.

2. A disc valve in accordance with claim 1 wherein said cylindrical tubular support means includes a central aperture extending through said first and second orifice plates to provide a constant fixed orifice flow path for the flow of the fluid solids mixture flowing in said tubular conduit through said valve independent of the relative rotational position between said first and second orifice plates.

3. A disc valve in accordance with claim 2 wherein said adjusting means includes a lug member extending radially outward from said second orifice plate through an aperture in said tubular conduit and rotatable threaded means engaging said lug member.

4. A disc valve in accordance with claim 3 wherein the orifices in said first and second orifice plates are circular.

5. A disc valve in accordance with claim 3 wherein the orifices in said first and second orifice plates are rectangular.

6. A disc valve in accordance with claim 2 wherein said support means includes an annular ring attached to and extending outwardly from said central aperture to overly and contact the upper surface of said first orifice plate.

7. A disc valve for controlling the flow of a gaseous stream such as present in petroleum processes comprising a cylindrical tubular conduit, outwardly extending flange means at opposite ends of said tubular conduit for mounting said tubular conduit in an upright position in a generally vertical process conduit in which a process gas is upwardly flowing therethrough, a flat planar first orifice plate extending transversely across said tubular conduit and weldably attached thereto, said first orifice plate including a plurality of spaced orifices disposed circumferentially thereabout, a flat planar second orifice plate having a plurality of orifices conforming in size and spacing to said orifices in said first orifice plate, means for pivotally mounting said second orifice plate upon said first orifice plate, means engaging a peripheral edge of said second orifice plate for rotationally adjusting the relative positions of the orifices in said first and second orifice plates to provide a variable flow component through said valve, said means for pivotally mounting said first and second orifice plates including a central aperture extending therethrough to provide a constant fixed orifice flow path for the flow of said petroleum process gaseous stream flowing in said tubular conduit through said valve independent of the relatively rotational position between said first and second orifice plates.

8. A disc valve in accordance with claim 7 wherein said pivotal mounting means includes an annular ring extending outwardly from said central aperture to overly and contact the downstream surface of said first orifice plate.

9. A disc valve in accordance with claim 8 including hard surfaced areas on said first and second orifice plates adjacent said spaced orifices.

10. A disc valve in accordance with claim 6 including hard surfaced areas on said first and second orifice plates adjacent said spaced orifices.

* * * * *